(12) United States Patent
Silver

(10) Patent No.: US 6,569,488 B2
(45) Date of Patent: May 27, 2003

(54) PROCESSES FOR MAKING NOVEL INULIN PRODUCTS

(76) Inventor: Barnard Stewart Silver, 4391 S. Carol Jane Dr., Salt Lake City, UT (US) 84124

( * ) Notice: Subject to any disclaimer, the term of this patent is extended or adjusted under 35 U.S.C. 154(b) by 0 days.

(21) Appl. No.: 10/037,027

(22) Filed: Nov. 9, 2001

(65) Prior Publication Data

US 2002/0098272 A1 Jul. 25, 2002

Related U.S. Application Data

(63) Continuation-in-part of application No. 09/716,780, filed on Nov. 20, 2000, now Pat. No. 6,419,978, and a continuation-in-part of application No. 09/553,973, filed on Apr. 20, 2000, now abandoned, and a continuation-in-part of application No. 09/379,952, filed on Aug. 24, 1999, now Pat. No. 6,399,142.
(60) Provisional application No. 60/104,091, filed on Oct. 13, 1998, and provisional application No. 60/098,195, filed on Aug. 27, 1998.

(51) Int. Cl.$^7$ .................................................. A23G 3/00
(52) U.S. Cl. ....................... 426/658; 426/271; 426/490; 426/548; 127/29
(58) Field of Search ................................. 426/271, 548, 426/658, 471, 490, 478; 127/29

(56) References Cited

U.S. PATENT DOCUMENTS

| | | | |
|---|---|---|---|
| 4,285,735 A | 8/1981 | Mitchell et al. | |
| 4,304,768 A | 12/1981 | Staub et al. | |
| 4,421,852 A | 12/1983 | Hoehn et al. | |
| 4,758,515 A | 7/1988 | Barwald et al. | |
| 4,954,622 A | 9/1990 | Cooper | |
| 5,051,408 A | 9/1991 | Cooper | |
| 5,319,048 A | 6/1994 | Carosino et al. | |
| 5,366,962 A | 11/1994 | Biton et al. | |
| 5,422,346 A | 6/1995 | Mitchell et al. | |
| 5,456,893 A | 10/1995 | Silver | |
| 5,476,844 A | 12/1995 | Cooper | |
| 5,502,180 A | 3/1996 | Kunz et al. | |
| 5,527,556 A | 6/1996 | Frippiat et al. | |
| 5,561,226 A | 10/1996 | Nitsch | |
| 5,659,028 A | 8/1997 | Coussement et al. | |
| 5,660,872 A | 8/1997 | Van Loo et al. | |
| 5,721,004 A | 2/1998 | James | |
| 5,827,526 A | 10/1998 | Dohnalek et al. | |
| 5,840,361 A | 11/1998 | Theuer et al. | |
| 5,882,709 A | 3/1999 | Zumbe | |
| 5,968,365 A | 10/1999 | Laurenzo et al. | |
| 5,989,619 A | 11/1999 | Zumbe et al. | |

FOREIGN PATENT DOCUMENTS

| | | |
|---|---|---|
| DE | 40 03 140 A1 | 8/1991 |
| EP | 787 745 A2 | 8/1987 |
| EP | 0787745 * | 8/1997 |
| JP | 03281601 | 12/1991 |
| WO | 91/18000 | 11/1991 |

OTHER PUBLICATIONS

Brochure entitled "Innovate with Raftiline," Mar. 1998.
E. Berghofer, A. Cramer, U. Schmidt and M. Veigl, "Pilot–Scale Production of Inulin from Chicory Roots and Its Use in Foodstuffs," institute of Food Technology, University of Agriculture, Peter–Jordanstraβe 82, 1190, Vienna, Austria, 1993.
Manfred Vogel, "A Process for the Production of Inulin and its Hydrolysis Products from Plant Material," Südzucker AG Mannheim/Ochsenfurt/Zentrallabor, 6718 Grünstadt, Germany, 1993.
K. Vukov, M. Erdélyi and E. Pichler–Magyar, "Preparation of Pure Inulin and Various Inulin–Containing Products from Jerusalem Artichoke for Human Consumption and for Diagnostic Use," University of Horticulture and Food Industry, Budapest, Hungary, 1993.
R.J. Thomann et al., "Recent Investigation on the Fractionation and Use of Products from Jerusalem Artichoke," A. Fuchs Editor, Proceedings of the Fifth Seminar on Inulin, Oct. 27, 1995, pp. 65–66.
"NPT–17 New High Performance Inulin", 1998 IFT Annual Meeting Technical Program Abstracts, p. 63.
Database WPI/Derwent; Derwent Publications Ltd., London, BG; AN76–66213X; XP002058197.
Peldyak, John, DMD, "Xylitol: Sweeten Your Smile," 1996, p. 2–52.
Birch, et al., AN 73 (11): G0549 FSTA, "The Composition and Properties of Diabetic Jams", abstracting Confectionery Production 1973, 39 (2), 73–76; 1973.
Teeuwen et al., AN 93(03); T0011 FSTA, "Inulin—A Versatile Fibre Ingredient", abstracting International Food Ingredients, 1992, No. 5, 10–14; 1992.
Thon, M., AN 359264 FROSTI, "Inulin—Dietary Fibre From Chicory", abstracting Food Tech Europe, 1994, 1(4), 62 + 64; 1994.
Teewen, Harald, Thone, Marc, Vandorpe, Johan, *Inulin: A Versatile Fibre Ingredient*, International Food Ingredients, (1992) No. 5, 10–14.
Birch, G.G.; Soon, E.B.T., *The Composition and Properties Of Diabetic Jams*, Confectionary Production, Feb. 1973, pp. 73–76.

* cited by examiner

*Primary Examiner*—Leslie Wong
(74) *Attorney, Agent, or Firm*—Brinks Hofer Gilson & Lione

(57) ABSTRACT

The process for preparing the novel inulin products includes extracting inulin with water from subdivided plant materials, holding the inulin rich extraction water in a settling tank while maintaining the temperature from about 0° C. to 7° C. which causes higher molecular weight polysaccharides to separate from water soluble lower molecular weight polysaccharides, and separating the higher molecular weight inulin fructose fractions from the more water soluble lower molecular weight inulin fractions.

21 Claims, 2 Drawing Sheets

PROCESSES FOR MAKING NOVEL INULIN PRODUCTS

CROSS REFERENCE TO RELATED APPLICATIONS

Figure 1:
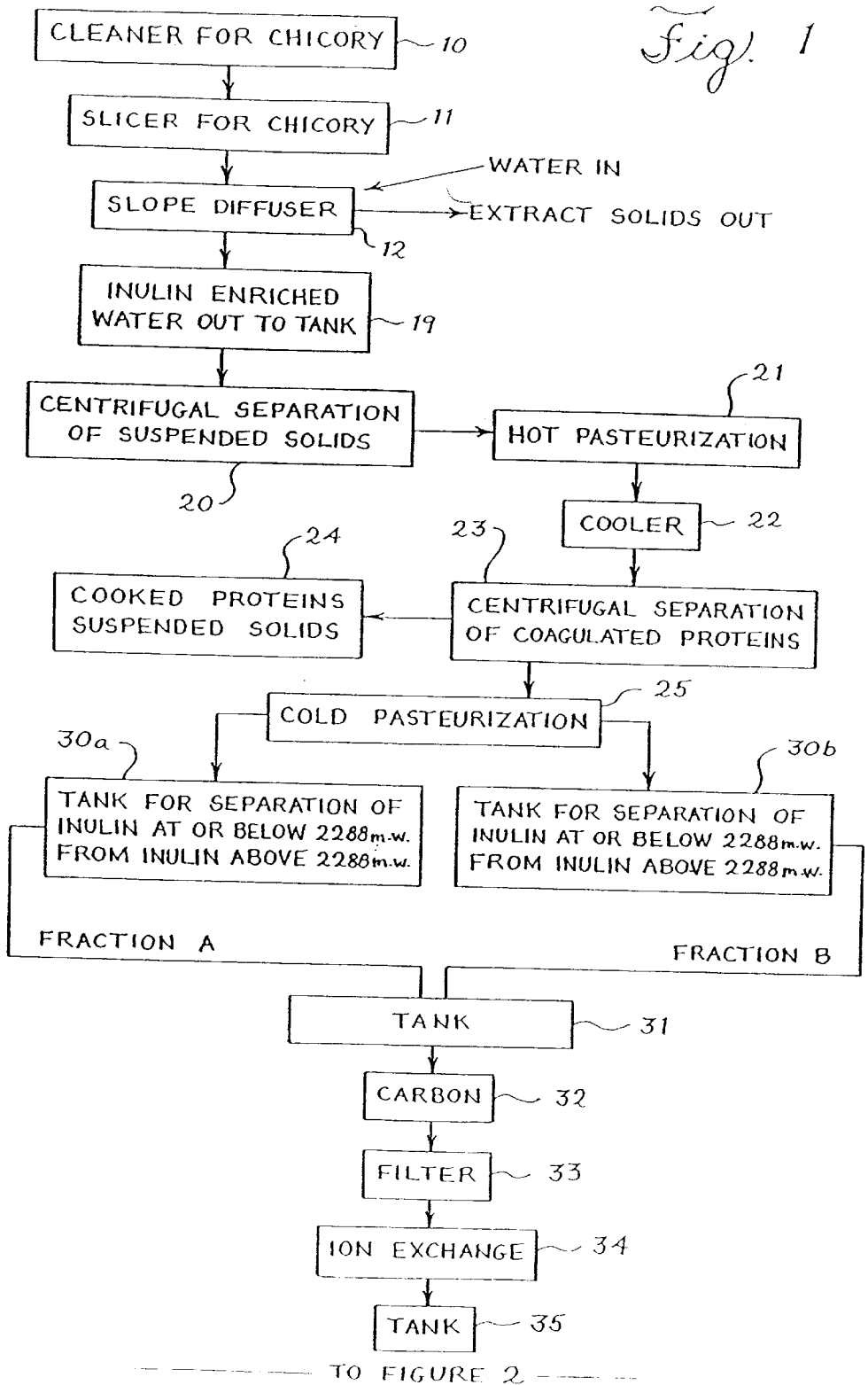

This application is a continuation-in-part of application Ser. No. 09/716,780 filed Nov. 20, 2000, now U.S. Pat. No. 6,419,978 and a continuation-in-part of Ser. No. 09/553,973, filed Apr. 20, 2000, now abandoned, and a continuation-in-part of application Ser. No. 09/379,952, filed Aug. 24, 1999, now U.S. Pat. No. 6,339,142 the latter of which claims priority to provisional applications Serial No. 60/098,195 filed Aug. 27, 1998, and Serial No. 60/104,091, filed Oct. 13, 1998.

FIELD OF THE INVENTION

This invention relates to processes for making novel inulin products, and food products containing such inulin products.

BACKGROUND OF THE INVENTION

Inulin, which has been extracted from plants for nearly 100 years with difficulty, belongs to the polysaccharide family of compounds. Inulin is composed of a mixture of polysaccharides having various molecular weights or degrees of polymerization (DP). In general, inulin consists of fructose units with β 1–2 bonds and end in a glucose unit. The addition or subtraction of fructose units affects inulin's molecular weight or degree of polymerization (DP). Typical inulin properties are set forth in Table 1 below.

TABLE 1

Typical Inulin Properties

| Properties | Assay |
|---|---|
| Description | After drying a fine white powder |
| Taste | Bland, with slight sweetness |
| Carbohydrate content on dry solids basis (ds) | >99.5% |
| Ash (sulfated) on ds | <0.2% |
| Heavy metals (as Pb) on ds | <0.5 mg/kg |
| Caloric content on ds | 1.5 kcal/g |

Inulin is the main carbohydrate in a variety of plants. Table 2 lists common inulin sources and the inulin concentrations therein.

TABLE 2

Common Sources of Inulin

| Source | Inulin % |
|---|---|
| Agave | 15–20 |
| Artichoke | 2–6 |
| Asparagus Root | 10–15 |
| Banana | 0.3 |
| Chicory Root | 15–20 |
| Dahlia Tuber | 15–20 |
| Dandelion | 15–20 |
| Edible Burdock (root) | 16 |
| Garlic | 15–25 |
| Jerusalem Artichoke | 15–20 |
| Leak | 10–15 |
| Onion | 2–6 |
| Rye | 0.7 |
| Salsify | 15–20 |
| Wheat | 0.4 |
| Yacon | 15–20 |

Chicory continues to be grown extensively throughout Europe, and its many varieties are harvested and processed into an assortment of products from salad greens and cattle feed to fructose and recently to inulin. Because of its ease of cultivation and harvesting, chicory has become the principal source of inulin today.

As inulin comes from the field in the chicory plant, its molecular weight depends on many factors such as time of planting, time of harvest, amount of stress, variety type, amount of time which elapsed between harvest and processing, amount of damage at harvest and other factors.

Today, inulin is approved for use as a food additive by the governments of nine European countries (Belgium, Denmark, France, Luxembourg, Netherlands, Portugal, Spain, Sweden, and Switzerland) and Japan, and its applications are varied.

Despite the approval of inulin as a food additive in many countries, the use of inulin has been limited, because, among other things, of the limited solubility and/or miscibility of inulin in water at ambient temperature, for example, at temperatures from about 10° C. to about 25° C.

One publication reports the solubility in water of inulin derived from chicory roots to be less than about 3% (% weight/volume) at 30° C., and less than about 5% (% weight/volume) at 40° C. See E. Berghofer et al., PILOT-SCALE PRODUCTION OF INULIN FROM CHICORY ROOTS AND ITS USE IN FOODSTUFFS, CROPS, Elsevier Science Publishers, B.V., A. Fuchs, Editor, 1993 (pp. 77–84).

Caloric concerns have long played a significant role in the food choice of the U.S. public, and low calorie foods have been popular for years. Foods of this category have been dominated by those products where fructose and sucrose have been replaced by an artificial sweetener which can add sweetness without the caloric impact. In particular, the success of the artificial sweeteners such as saccharin, aspartame and more recently sucralose, should be noted.

Most artificial sweeteners, such as saccharin and aspartame, have 180 to 300 times the sweetness of an equivalent dose of sucrose. Sucralose is a sweetener 600 times sweeter than sugar. Therefore, food processors will obviously use a much lower volume of these artificial sweeteners in their low calorie foods than the volume of sugar which they replace. With dry goods (such as baked products), food processors are forced to "back fill" the volume of the removed sugar which the artificial sweeteners do not replace. This back fill product is referred to as a "bulking agent." Bulking agents are found in a variety of products, including chewing gums, confectioneries, baking mixes, meat products, and packets containing the artificial sweetener in amounts equivalent of one or more teaspoons of sugar. The optimal bulking agents should bring the physical and chemical characteristics of sugar back to the food without adding back calories or contributing significantly to product cost.

Bulking agents are evaluated against the following criteria:

1. Significantly fewer calories than sucrose, glucose or fructose.
2. Physical and chemical properties that match those of sucrose in all food applications
3. Mouthfeel comparable to sugar.
4. Freedom from adhesion to lips and tongue.
5. Freedom from toothpack (freedom from packing into crowns of teeth).
6. Preferably, demonstrate existence of secondary health benefits 7. No negative side effects and completely safe at reasonable levels of consumption
8. In the dry product, freedom from caking and clumping.
9. In the wet product no settling out or fractionation upon standing.

More specifically, in order to effectively replace sucrose and fructose and their organoleptic qualities, potential bulking agents must display the following characteristics:

Safe
Stable
Low calorie
Minimal gastrointestinal side effects
Low cost
No off-flavors
High solubility
Low viscosity
Crystalline
Ability to brown
Protein/Starch interactions similar to sucrose A major obstacle to the use of inulin as a bulking agent in foodstuffs despite its many advantages is its rather low solubility in water at ambient temperatures.

Another major obstacle to the use of inulin as a bulking agent is the presence of various amounts of glucose and fructose, which are naturally contained therein, and which have made inulin difficult to dry and difficult to handle and store. In the drying of inulin, the presence of glucose and fructose, which are hygroscopic, interferes with the drying process, unless there is a large proportion of high molecular weight inulin which dries more readily than the lower molecular weight inulin compounds. Even after drying, the hygroscopicity of glucose and fructose tends to reintroduce moisture into the product.

In the case of granular or dry inulin products, the hygroscopic activity of glucose and fructose tends to cause undesirable caking and clumping. Due to the caking and clumping the granular or dry inulin products containing glucose and fructose are difficult to handle, store, and blend.

In addition, most inulin products used as bulking agents with artificial sweeteners heretofore have contained significant amounts of fructose and glucose and also contained high molecular weight inulin compounds, for example, molecular weights above 2288. When such inulin products are taken by mouth, there is a formation of sticky, hard substance in the mouth caused by the insolubility of such high molecular weight inulin in the saliva at body temperatures. This sticky substance may adhere to the lips and tongue, and may pack on the crowns of the consumer's teeth. In some cases, the sticky substance forms a crusty insoluble mass in the mouth which must be chewed in order to break up.

In the case of liquid inulin products, there is tendency for higher molecular weight inulin fractions to "settle out," or fractionate, upon standing which has made it difficult to provide a satisfactory liquid product.

Inulin comprises polysaccharides, fragile polymers, which are difficult to extract by classical prior methods. European Patent 787 745 illustrates one method for extraction of inulin from Jerusalem artichokes using the classical sugarbeet extraction, and then clarifying the inulin rich extraction liquid by ultrafiltration. Silver U.S. Pat. No. 5,456,893 discloses a process and apparatus for extracting inulin in a manner which does not degrade the inulin or allow the inulin to be broken down.

OBJECTS OF THE INVENTION

Accordingly, it is an object of the invention to design novel products of inulin which have improved properties for use in foodstuffs, in particular, improved solubility at ambient temperatures.

It is a further object of the invention to provide novel products of inulin characterized by reduced hygroscopicity.

It is another object of the invention to design products of inulin that can be used as bulking agents without a tendency to cake and clump.

It is still another object of the invention to design products of inulin that can be used as bulking agents without formation of undesirable sticky substances in the mouth.

It is still another object of the invention to design products of inulin that can be used as bulking agents that can be mixed with water without formation of sticky clumps or lumps.

It is another object of the invention to design water base products containing inulin which have a reduced tendency to fractionate or settle out upon standing.

It is yet another object of the invention to provide novel processes for separating inulin into desirable products that have improved water solubility and/or water miscibility at ambient temperatures.

It is still yet another object of the invention to provide novel processes for separating high molecular weight fractions of inulin which are suitable as, for example, ingredients for food, or as fat substitutes.

Other objects of the invention will be apparent from the following description and accompanying drawing.

DRAWING

Figure 2:
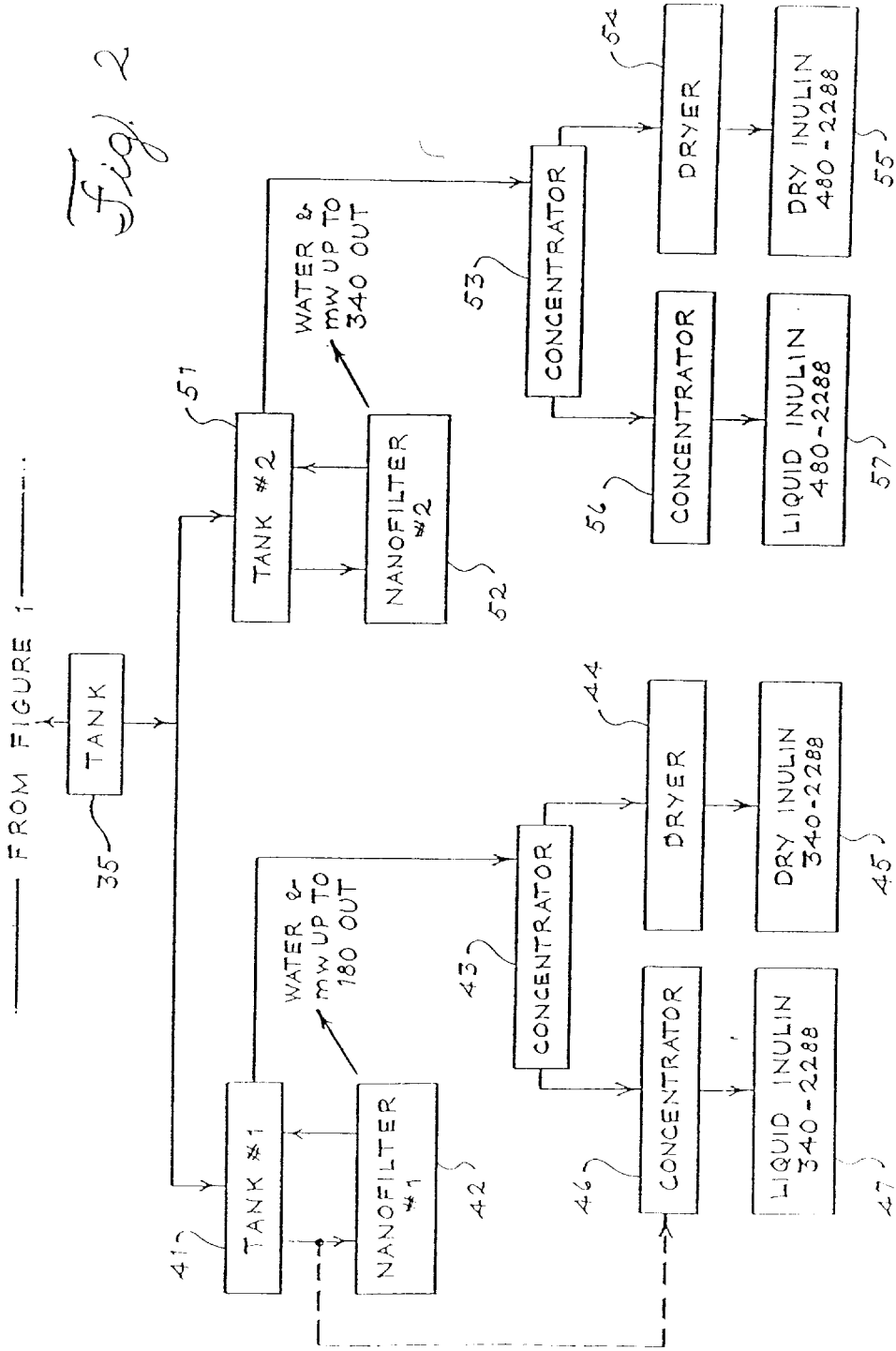

FIGS. 1 and 2 of the drawings contain a flow diagram illustrating the preferred process of the invention.

DETAILED DESCRIPTION OF THE INVENTION

In accordance with the objects of the invention, it has been discovered that novel fractions of inulin containing at least two, preferably at least three, desirably at least four, different polysaccharides each with differing molecular weights in the range of about 2288 and below, and in which said fractions have less than 25% by weight of polysaccharides with molecular weights above 2288, exhibit improved water solubility and/or water miscibility. Inulin portions having molecular weights in the range from about 340 to about 2288 preferably in the range from about 480 to about 2288, have unexpected benefits especially when such fractions are used as a bulking agent, such as a bulking agent in combination with at least one artificial sweetener.

The novel inulin low molecular weight fractions of the invention preferably at least about 75% by weight of inulin polysaccharides, has molecular weights below about 2288. (Unless otherwise indicated, all percentages as used herein are on a dry weight basis.) The foregoing novel inulin fractions have improved water solubility and/or water miscibility at ambient temperatures, for example, temperatures from about 10° C. to about 25° C.

The high molecular weight fractions of inulin preferably contain at least about 75% by weight of inulin polysaccharides having molecular weights above about 2288, and less than about 25%, desirably less than about 20%, and most desirably below about 15% by weight of inulin compounds having molecular weights below 2288.

The novel inulin products of the invention can be prepared from one or more of the many sources of inulin; for example, chicory root, Jerusalem artichoke, dahlia tubers, agave and the like (see Table 2 above). Although the following description will describe preparation of fractions derived from chicory root, it is understood that the process of the invention is applicable as well to other plants containing inulin.

Referring to FIG. 1 of the drawings, the chicory roots are first cleaned at 10 and then subdivided at 11. The subdividing reduces the chicory to pieces preferably no thinner than about 0.24 centimeters thick. Various pieces of various apparatus may be used for chopping or cutting the chicory, as is well known in the art.

After subdividing, the chicory is introduced into an extractor, as shown at 12, preferably an extractor of the type shown in Silver U.S. Pat. No. 5,456,893. Other extraction systems may be used, for example, extraction by pressing.

After extraction, the inulin rich extraction liquid (water, or water base liquid) is collected in a surge tank 19 and continuously pumped to a clarifying type centrifugal 20 where particles, suspended soils, and solids are separated out as a waste or animal feed by-product.

The inulin enriched extraction liquid is then delivered to a pasteurization feed tank and system, and pasteurized at 21. The purpose of the pasteurization is to kill any bacteria present and to denature the enzymes in order to stop any further enzymatic activity. In the process of the present invention, it is preferable to heat the extraction to temperatures and pressures sufficiently high to coagulate the proteins so that they may be separated from the inulin by filtration or centrifugation. Any suitable pasteurization steps which accomplish the foregoing purposes are satisfactory, for example, heating to about 107° C. for five to nine minutes at elevated pressure, such as 103.4 cm of Hg.

The pasteurized inulin is preferably cooled immediately after pasteurization, as shown in 22, in order to minimize the thermal breakdown of inulin and thereby to increase the yield.

After pasteurization, the inulin rich liquid is clarified to remove coagulated proteins, as shown at 23. Any suitable clarifier, filter, or centrifugal separator may be used although it is preferred to use a centrifugal separator in order to maximize the yield of inulin. The cooked protein and suspended solids, as shown at 24, are removed from the inulin stream as a by-product.

With the removal of most of the coagulated proteins at 23, the inulin rich liquid is next cold pasteurized 25 for the removal of spores and any bacteria not killed in the hot pasteurization process. A 1000 angstrom ultrafiltration filter is preferred for this purpose. The retentate, in part, should be circulated back through a filter, or the centrifugal separator 23, in order to remove materials over 1000 angstrom in size and prevent them from being fed back to the ultrafiltration filter 25.

One of the discoveries of this invention is that inulin rich liquid can be separated into two fractions: one, Fraction A, containing at least about 75% by weight polysaccharides with molecular weights of about 2288 and below; and a second, Fraction M, of inulin with molecular weights of about 2450 and above.

The permeate of the cold pasteurization process 25 is sent, in turns, to tank 30a, tank 30b, etc, or to centrifugal separators. Here the inulin rich liquid is separated into the fractions A and M, each containing inulin of predominately different molecular weights. In accordance with the present invention, the inulin compounds are separated into two fractions, Fraction A with molecular weights up to and including 2288, and Fraction M with inulin compounds having molecular weights above 2288. Referring to 30a and 30b, the separations may be performed by settling tanks, as described below.

The inulin rich water extraction medium is introduced into a first settling tank at 30a and held at temperatures at about ambient and below for settling out of some of the high molecular weight fractions of inulin. The temperatures are preferably less than 7° C., more preferably between about 0° C. to about 7° C. and most desirably between about 0° C. and 3° C., for a period of time to allow at least some of the higher molecular weight inulin to settle out, usually at least about 5 hours, preferably at least about 10 hours, and desirable at least about 20 hours, ordinarily, usually about 24–48 hours. After settling out of some of the high molecular weight inulin fraction, the liquid medium is decanted from the first settling tank 30a into another tank 31.

The liquid medium decanted from first tank 30a is inulin rich water containing at least about 75%, preferably at least about 80% by weight of polysaccharides with molecular weights of 2288 and below, the low molecular weight inulin fraction.

It is a discovery of this present invention that Fraction A has highly desirable properties for food and for food blending as a bulking agent. Fraction A can be processed and refined as detailed hereafter.

The settled out Fraction M, in the first settling tank 30a is first washed and then removed as a by-product. The washings of Fraction M usually contain the lower molecular weight polysaccharides and are also introduced into tank 31. Fraction M can be processed as will be described hereinafter.

Since the settling tanks usually require standing of the inulin for at least about 5 hours, preferably several such settling tanks are used as described above to perform identical functions in order to economize the settling time and increase production. As illustrated 30b is another tank in parallel with 30a for performing the identical function. Other tanks (30c, 30d, etc., not shown), may be used in parallel with tanks 30a and 30b.

Although the separation herein described above is performed in settling tanks, it is also contemplated that separation be performed by centrifuges.

In the process of centrifugal separation, the inulin is much more quickly concentrated by high gravity forces 1500 to 15,000 times greater than the settling gravity of tanks 30a and 30b. Centrifugation thus has the benefit of shortening the process time and decreasing the opportunity for bacterial infection.

Furthermore, cooling centrifugals have been developed in which temperatures of the inulin rich water is controlled as Fraction A and Fraction M form in the centrifuge.

Liquid compositions of inulin, for example the inulin rich extraction liquid introduced into settling tank 30a, containing both high molecular weight fractions inulin (at least about 75% by weight of inulin polysaccharides with molecular weights above about 2288) and low molecular weight fractions (at least about 75% by weight of inulin polysaccharides with molecular weights below about 2288) tend to form a thixotropic gelled phase when the amounts of water in the liquid composition are reduced to low levels, such as, when the combined solids content rises to above about 15% by weight. The thixotropic gelled phase reduces the settling out of the high molecular weight fraction.

The term thixotropic gelled phase, as used herein, refers to that characteristic of inulin containing high molecular weight inulin polysaccharides which appears as a thick viscous cream upon standing without agitation for about 60 days or less. The thixotropic gelled phase of inulin can be liquified with agitation or shearing, or upon heating to elevated temperatures.

The inulin rich liquid composition, therefore, preferably is supplied to, or contained in, the settling tanks 30a and 30b, or centrifuges, with sufficient water content to prevent forming the thixotropic gelled phase, and preferably contains, therefore, sufficient amounts of water to maintain the solids content of the liquid composition below about 15% by weight. At the same time, the amount of combined high and low molecular weight inulin in the liquid solution preferably is sufficiently high, for example, above about 10% by weight of the water together with the water soluble solids in order to promote settling out of the high molecular weight inulin fraction.

The preferred temperatures for settling out of the high molecular weight inulin are ambient temperatures and below, most preferably below ambient temperatures, desirably at about 7° C. and below, more desirably in the range from about 0° to about 7° C., and most desirably in the range from about 0° C. and about 3° C. for a period of time sufficient to allow at least some of the high molecular weight fraction to settle out. The lower temperatures are preferred because they inactivate bacteria and promote a more rapid settling out of the high molecular weight fraction.

The time for settling out depends upon various factors such as the temperature of the inulin rich liquid composition and the concentrations of the high and low inulin fractions. Usually some settling out of the high molecular weight inulin occurs in the settling tanks upon standing without agitation anywhere from about 2 to 30 hours.

Fraction A decanted from the settling tanks or centrifuges can be treated to remove the bitter taste of chicory from the inulin enriched water. An activated carbon treatment as shown in 32 works satisfactorily for this purpose. However, any technique can be used to remove the bitter flavor which does not destroy substantial amounts of the fragile polysaccharides.

A preferred method for removing color and unwanted flavors from Fraction A is to heat Fraction A to temperatures above ambient, for example, temperatures from about 33° C. to about 36° C., and to pump said heated fractions through a series of carbon columns until the unwanted flavors and/or colors disappear. The fraction can be further treated by passing through a series of mixed bed ion exchange columns to remove some potassium and iron.

An advantage of pumping only the liquid portion containing the low molecular weight inulin through the activated carbon treatment is that this fraction does not readily plug up the activated or granular carbon pores or ion exchange columns which may follow. This reduces costs of production and increases the yield of inulin.

From tank 31, the inulin enriched supernatant water is introduced into the carbon columns 32 where color and the bitter flavor that is in the chicory is removed. Then the supernatant may be passed through ion exchange columns 34. In the ion exchange columns, various trace elements are removed such as calcium, phosphorus, potassium and iron. This step is optional as it may be desirable to retain the minerals in the final product.

In between the carbon columns 32 and the ion exchange columns 34, a filter 33 is located to filter out any carbon fines that might be carried in the stream of inulin enriched supernatant and which would contaminate the resins of the ion exchange columns. A 5 micron mesh was found to be satisfactory for this filter although other sizes might be suitable. From these columns, the now purified inulin enriched supernatant comes out as a clear, translucent liquid at a concentration between 5 percent to 15 percent solids and is then introduced to tank 35 (see bottom—FIG. 1, and top—FIG. 2).

Referring to FIG. 2, from tank 35, the inulin enriched supernatant is pumped to tank #1, 41, to the full mark. Then nanofilter #1, 42, is put into operation.

From tank 41, the material goes through nanofilter No. 1, 42. This filter uses a membrane manufactured to remove the fructose and glucose from the inulin and makes the first separation of an inulin product whose molecular weight ranges predominantly from 340 up to and including 2288 molecular weight. The concentrate from this filter is fed to a concentrator 43 where it is concentrated to a consistency satisfactory to be fed to a dryer 44 (for example, a prior art falling film evaporator, spray dryer or freeze dryer), where it can be dried into an inulin product substantially free of fructose and glucose (and other monosaccharides). The granulated or dried inulin may be stored in dry inulin bin 45. Preferably, the inulin products of the invention contain less than about 0.75%, and desirably less than about 0.5% by weight of monosaccharides. The monosaccharides are hygroscopic and tend to cause the inulin fraction to cake and lump, and reduction of the amounts of monosaccharides reduces that undesirable property.

An alternate production stream may bypass the dryer 44 and go to a second concentrator 46 where it is concentrated to the desired solids to liquid ratio and then stored in liquid inulin tank 47. A desirable inulin product is an inulin rich syrup containing at least about 45%, preferably at least about 50%, and desirably at least about 55%, by weight of inulin solids of the low molecular weight inulin having at least about 75% weight of inulin polysaccharides with molecular weights below about 2288.

A second stream coming from tank No. 2, 51, can be treated by being pumped to nanofilter No. 2, 52. In this filter, membranes are provided which remove the sucrose as well as the fructose and glucose and a concentrate is provided whose molecular weight ranges from 480 on up to and including 2288. The concentrate from this filter is fed to a concentrator 53 where it is concentrated to a consistency satisfactory to be fed to a dryer 54 where it can be dried into an inulin fraction substantially fee of fructose, glucose, and sucrose. The product is stored in dry inulin bin 55. An alternate production stream may bypass the dryer 54 and go to concentrator 56 where it is concentrated to the desired solids to liquid ratio and then stored in liquid tank 57 or bottled. The dry or liquid product comes out with inulin having molecular weight predominantly between 480 up to and including 2288.

Another fraction of inulin can be taken from the tank 31 and sent through the carbon columns 32 and ion exchange 34 through tank 41 directly to concentrator 46 that will concentrate it up to the desired solids to liquids ratio to produce a finished liquid inulin that has molecular weight up to and including 2288. Each of these products of inulin can be used for specific services in foods and food blending.

In place of the settling tanks, centrifugals can be used to separate the high molecular weight inulin that is above the 2288 molecular weight from the inulin at or below a molecular weight of 2288. Depending on the concentration and the number of Gs applied there can be different fractions of inulin separated. This provides great flexibility in the ranges of molecular weight in most products.

The high molecular weight inulin, Fraction M above, which is separated form the low molecular weight inulin can be used to prepare useful inulin products. These products also can be blended with other foods. The high molecular weight inulin has the mouth feel of and consistency of fats, especially butter and cocoa fats.

When the high molecular weight inulin fraction is used directly, the product is generally in a thixotropic gelled phase. This is the easiest form in which it can be blended with other foods. It can be concentrated into a thickened product by centrifugation. The resulting product is a very creamy gel. The high molecular weight inulin may also be concentrated in a falling film evaporator into a rich creamy syrup. Lastly, the high molecular weight inulin may be spray dried or freeze dried to produce a fine granular powder. This powder, when mixed with water at room temperatures or below, is highly insoluble and produces a hazy liquid composition.

In the process of producing the high molecular weight inulin fraction, Fraction M, the monosaccharides are less than about 0.75%, and desirably less than about 0.5% by weight. This property of the fraction increases the rate of spray drying and greatly reduces the resulting product's hygroscopicity. The amount of disaccharides in Fraction M are less than about 0.75%, and desirably less than about 0.5% by weight. The very low sugars content in Fraction M make this product very desirable for non-sugar diets.

Also, in the process of producing the high molecular weight inulin fraction, Fraction M, the bitter flavor which is in chicory juices, can be washed out of this fraction by one or several washes. This makes unnecessary a carbon treatment of the high molecular weight inulin fraction which is a very great advantage since the high molecular weight inulin plugs up the activated carbon or granular carbon cylinders or retorts. The yield of high molecular weight inulin through this washing process is hereby greatly increased.

Briefly, a preferred process of the invention can be best illustrated by the following Examples.

EXAMPLE 1

A. EXTRACTION

Chicory tubers were cleaned, cut in a Putsch Slicer to sizes no thinner than about 0.24 centimeters thick, and then introduced into a slope diffuser of the type shown in FIGS. 2 and 3 of U.S. Pat. No. 5,456,893.

Well water was used as the liquid extraction medium in the slope diffuser at a pH from 5.5 to 7.0. In the slope diffuser the water was heated to temperatures from 70° C.–80° C. at ambient pressures. The sliced chicory solids were introduced into the lower end of the slope diffuser and moved countercurrent to the flow of the heated water for extraction of inulin from the chicory. The dwell time of the chicory solids in the slope diffuser of U.S. Pat. No. 5,456,893 was from about 20 minutes to one (1) hour.

B. PASTEURIZATION AND CLARIFICATION

The inulin rich extraction water from the slope diffuser was collected in a vessel and then pumped to a pusher type clarifying centrifugal rotating at 3600 RPM. Suspended solid particles and pulp were removed in the centrifugal. The clarified inulin rich extraction water then flowed by gravity from the centrifugal to the pasteurizing tank, a steam jacketed round tank. In this tank the clarified (pulp free) inulin rich extraction water was heated by 6.8 kg exhaust steam to between 91°–93° C. for about 15 minutes at ambient pressures, in order to kill the bacteria, coagulate the protein particles present, and to denature the enzymes. From the pasteurizing tank inulin rich water was pumped to a feed tank for feeding a filter to separate the coagulated proteins, insoluble particles, and bacteria from the inulin rich water.

The pasteurized inulin rich water was passed through 1000 angstrom ceramic filters in a U.S. Filter Membralox unit. This filtration removed bacteria and essentially all insoluble particles over 1000 angstrom size from the permeate. The filtered inulin rich water permeate was collected in a tank for further processing.

About two thirds of the concentrate in the Membralox filter circulated in the filter with about one third by volume bled off to the clarifying centrifugal which was placed ahead of the pasteurizer. In this manner, the solids content of the concentrate in the membralox filter was maintained at a reasonably low value and minimized plugging of the Membralox's filter elements.

C. SEPARATION OF INULIN INTO DIFFERENT MOLECULAR WEIGHT FRACTIONS

After cold pasteurization through a 1000 angstrom sized filter, the inulin juice is directed to a cooled holding column and cooled to a range of 1° C. to 5° C.

The inulin rich water extraction medium was separated into two fractions each containing inulin of predominantly different molecular weights.

In the holding column the cooled heavier molecular weight inulin drops out of solution into what appears to be in a colloidal form, which settles to the bottom of the column. The higher the RdS (refractometer dry substance) of the mother solution, the more rapidly the heavier molecular weight inulin forms into an appearance of a colloidal state. Also, more rapid cooling accelerates the formation of the heavier molecular weight inulin into what appears to be the colloidal state of suspended inulin.

With time (approximately twenty-four hours) and quiescent conditions (and with a solids content of at least about 5%, preferably at least about 10% (w/v), and desirably at least about 15% (w/v) (percent refers to grams of inulin per 100 milliliters of water), the suspended inulin settles to the bottom of the holding column. The supernatant liquid which is left may then be siphoned off the top, put through a carbon filter, concentrated and bottled, canned, or frozen as a bulking agent (i.e. a sucrose replacer) syrup, or further processed for drying.

The remaining colloidal-appearing inulin may then be pumped to a "washing column" or washed in place in the holding column with distilled, deionized, or ozonated water. In its simplest form, wash water is introduced in the bottom of the holding column through equally spaced non-clogging water distributors. The water has sufficient head behind it to feed the water up through the distributors evenly over the cross section of the holding and/or washing column. Because of the head of water behind it and because of the lower density of the introduced wash water, the wash water will rise uniformly up the column of precipitated inulin and wash the sugars and lighter molecular weight inulin towards the upper section of the holding column. The heavier molecular weight inulin will slowly sink toward the bottom of the column because of its greater weight, thus tending to segregate the inulin by molecular weight as the sinking heavier molecular weight inulin pushes the lower molecular weight inulin upward.

After one washing in a 1.8 meter wash column of 46 cm (7.6 liters) of precipitated inulin with 7.6 liters of deionized water, the results are as shown in Table 3. The water used for washing was at about 21° C. The column was left to stand for thirty hours at about 7° C.

TABLE 3

First Washing of Precipitated Inulin

| Product Name | Sample | Fructose/Glucose Fraction 180 Mol. Wt. | Sucrose Fraction 340 Mol. Wt. | Light Weight Fraction 340–2288 Mol. Wt. | Light Weight Fraction 480–2288 Mol. Wt. | Heavy Weight Fraction 2450 and Above Mol. Wt. |
|---|---|---|---|---|---|---|
| Wash | A | 3.95% | 1.15% | 51.14% | 49.99% | 44.91% |
| Precipitate | B | 2.97% | 0.94% | 47.42% | 46.48% | 44.95% |

(all percentages are on a dry weight basis)

To increase the segregation of the inulin by molecular weight, second, third and even fourth washings may be used along with longer times allowed for segregation, lower temperatures of wash water (down to 0.6° C.), taller washing columns, and lower temperatures (down to 2° C.) of materials residing in the washing column between washings. After each washing, the supernatant which may contain some color materials (but desirably not the colloidal inulin) is siphoned off, run through a carbon column if desired for decolorization, concentrated if desired and packaged as a syrup for inulin's application as a bulking agent.

In the washing of the apparent colloidal inulin, as long as the washing water is kept between 2° C. to 7° C. and the wash column between 2° C. to 7° C., very little of the apparent colloidal inulin is redissolved. There is a direct correlation between the solubility of colloidal inulin and temperature of the liquid surrounding it. There is also a reverse correlation between the concentration of inulin in the surrounding liquid and the solubility in it of the heavier molecular weight inulin. If the volume of washing water is limited to less than one volume per one volume of inulin colloid and temperatures throughout the process kept low, little colloidal inulin is redissolved. If sufficient time is given, the washing water forms a transparent and sometimes dark supernatant above a clear-cut line below which is apparently an opaque white inulin colloid.

The supernatant is siphoned off after its clear formation following each washing and processed, as required for color removal through the carbon column, and concentrated (by reverse osmosis or vacuum evaporation).

The precipitated suspended inulin is left in the column to concentrate as heavier molecular weight inulin settles to the bottom. This inulin may be siphoned out, drained out, or scooped out of the column depending on the consistency of the settled inulin.

In order to more clearly separate the heavier molecular weight inulin from the fructose and glucose, and, if desired, also from the sucrose present, in the supernatant, the supernatant is run through a filter preferably a Synder (brand) special axial-flow nanofilter membrane having a nominal molecular weight cut-off of 300 mounted in a U.S. Filter housing. An example, sample C of the concentrate is shown in Table 4. Sample D shows how the separation would be with a projected filter membrane having a nominal molecular weight cut-off of 400.

TABLE 4

Molecular Weight Characteristics of a Final Inulin Product

| Product Name | Sample ID | Fructose/Glucose Fraction 180 Mol. Wt. | Sucrose 340 Mol. Wt. | Light Wt. Fraction 340–2288 Mol. Wt. | Light Wt. Fraction 480–2288 Mol. Wt. | Heavy Wt. Fraction 2450 and Above Mol. Wt. |
|---|---|---|---|---|---|---|
| Inulin Bulking Agent | C | 0.76% | Light Weight Fraction | 86.34% | | 12.83% |
| | D | 0.76% | 0.14% | | 86.20% | 12.83% |

(all percentages are on a dry weight basis)

Optionally, the concentrate may be passed through a chromatographic separation column for removal of much of the disaccharides.

EXAMPLE 2

The extraction is performed the same as in Example 1. The separation into different molecular weights also is performed as in Example 1, except that instead of decanting the supernatent liquid from the settling tanks, the precipitate and supernatent liquid are cooled, and while cooled are introduced into a centrifugal, which is preferably cooled in the range from about 0° C. to about 7° C. The centrifuge is operated to separate the precipitate from the supernatent liquid. Otherwise, the steps of Example 2 follow the steps of Example 1.

The supernatant liquid obtained from Examples 1 and 2 contains novel fractions of inulin as more specifically defined below. The novel low molecular weight fractions of inulin may be maintained in the liquid, or the liquid with reduced amounts of water, and used in various applications, or the novel inulin fractions may be concentrated from the liquid into syrups or granular inulin by prior art techniques; for example, by prior art methods such as falling film evaporation, spray-drying, or freeze-drying.

Preferably, the combination of a falling film evaporation and spray drying is used to reduce fuel costs. In the combined drying process, the inulin rich supernatent liquid obtained from Examples 1 and 2 is first passed through a falling film evaporator to reduce the water contents to less than 70% by weight, preferably less than 60% by weight, and most desirably less than 50% by weight. After such removal of some water by the falling film evaporator, the inulin rich liquid preferably is then dried with a spray drier to a granular product.

The novel low molecular weight inulin fractions of the invention have improved solubility in water at ambient temperatures. The granular inulin fractions of the invention are soluble in water in amounts of at least about 5 grams per 100 milliliters of water ($\geq 0.05$ w/v), preferably at least about 10 grams per 100 ml of water ($\geq 0.1$ w/v), and desirably at least about 20 grams per 100 milliliters of water ($\geq 0.2\%$ w/v) at temperatures in the range from about 10° C. to about 25° C. By water soluble is meant capable of being dissolved in water.

The term miscible as used herein means the capability of inulin to mix with water above the point of being dissolved in water.

It has been observed that the granular inulin products of the invention when mixed with water in the amounts above about for example 40 gms/100 ml at 22° C. exhibit a haze which is characterized herein as one example of water miscibility. The haze becomes more opaque as more of the inulin fraction is added to the water.

The novel low molecular weight fractions of inulin produced by the process of the invention are polysaccharides having molecular weights in the range from about 340 to about 2288 and preferably in the range from about 480 to about 2288, polysaccharides that are water soluble. Accordingly, the novel inulin fractions of the invention are especially useful in admixture with other foods, especially other water soluble foods, or in admixture with artificial sweeteners.

By artificial sweeteners is meant any sweetening agent, whether synthetic compounds or those derived from naturally occurring substances, for example, derived from plant components, that can be safely ingested by humans, other than sucrose, glucose, fructose and lactose. Examples of artificial sweeteners as defined herein include aspartane, saccharin, sucralose ("Splenda"™), acesulfame potassium ("Sunett"™), xylitol, sorbitol, mannitol, maltose and maltitol. Combinations of the foregoing artificial sweeteners may be used singly, or admixed, and combined with the inulin fractions of the present invention.

In some instances, one or more of sucrose, glucose, fructose or lactose sugars alone or with one or more artificial sweeteners, and combined with the inulin fractions of the invention may be desirable. Such combinations would reduce the caloric content, and at the same time benefit from presence of the low molecular weight inulin fraction.

The benefits of the invention described herein are many. In the granular form of the novel inulin products, the product has reduced hygroscopicity. Also, when dissolved in water, the granular product is more easily dissolved and has a reduced tendency to form insoluble compounds which settle out. The novel products of the invention make ideal bulking agents for admixture with artificial sweeteners.

Due to the fact that the novel products of inulin in granular form with less than about 0.75% by weight of monosaccharides have reduced hygroscopicity, such inulin products of the invention have a reduced tendency to cake or lump upon storage. The freedom from caking or lumping is important, especially when the product is used in admixture with artificial sweeteners, a product in which instant solubility is highly desirable.

The inulin low molecular weight fractions of the invention are products with improved mouth feel and do not form undesirable sticky substances in the mouth, the latter of which is a characteristic of some other inulin products.

When mixed with water, the inulin products of the invention have a reduced tendency to form sticky clumps or lumps. The inulin products of the invention also have a reduced tendency to settle out of the water upon standing.

The preferred inulin products contain polysaccharides having a molecular weight range from about 480 to 2288 molecular weight which substantially eliminates sucrose; for example, dissacharrides (such as sucrose) are less than 2%, and preferably less than 1% by weight. This specific fraction has particular application to the health conscience public. There is an increase interest in eliminating sucrose from the diet due to the increase in obesity among our population. Moreover, the diabetic population necessarily needs to eliminate sucrose from its diet. Accordingly, this specific novel inulin product has particular benefits in meeting the desires, and needs, of our health conscience population.

A preferred embodiment of the invention is in the form of small packets containing at least one artificial sweetener in amounts equal in sweetness to one, two, or more teaspoons of sucrose, together with at least one inulin product containing the low molecular weight inulin fraction of the invention as the bulking agent.

The process of the invention has many benefits. In particular, the process can be carried out without excessive costs. The process also is less expensive than the procedures heretofore used commercially and gives a more consistent product. The novel fractions of inulin of the invention are heat stable and thereby useful in baked goods. The artificial sweetener sucralose is also heat stable; therefore, the admixture of sucralose and the novel fractions of the invention can be used in place of sucrose in cooking and baking.

Many further advantages and benefits of the invention will be apparent to those skilled in the field. In addition, there are many modifications and variations that can be made to the product and process as will be apparent to those skilled in the field without varying from the spirit and scope of the invention.

I claim:

1. A process for preparing products of inulin comprising:
   providing a liquid composition containing water and inulin;
   said inulin containing a high molecular weight inulin fraction and a low molecular weight inulin fraction;
   said liquid composition containing water in amounts sufficient to prevent the liquid composition from forming a thixotropic gelled phase upon standing without agitation;
   said high molecular weight inulin fraction comprising at least about 75% by weight of inulin polysaccacharides with molecular weights above about 2288;
   said low molecular weight inulin fraction comprising at least about 75% by weight of inulin polysaccacharides with molecular weights below about 2288;
   maintaining said liquid composition containing both said high and said low molecular weight inulin fractions at ambient temperatures and below for a time to and during at least a portion of the settling out of at least some of said high molecular weight inulin fraction; and separating at least some of the remainder of said liquid composition from at least some of said settled out high molecular weight inulin fraction.

2. The process of claim 1 in which the temperatures of the liquid composition during at least a portion of the time for settling out of at least some of the high molecular weight fraction are in the range of ambient temperatures.

3. The process of claim 1 in which the temperatures of the liquid composition during at least a portion of the time for settling out of at least some of the high molecular weight fraction are in the range of ambient temperatures and below.

4. The process of claim 1 in which the temperatures of the liquid composition during at least a portion of the time for settling out of at least some of the high molecular weight fraction are below about 7° C.

5. The process of claim 1 in which the temperatures of the liquid composition during at least a portion of the time for settling out of at least some of the high molecular weight fraction are in the range from about 3° C. to 0° C.

6. The process of claim 1 in which at least some of the remainder of said liquid composition is decanted from said settled out high molecular weight inulin fraction.

7. The process of claim 1 in which at least some of said high molecular weight inulin fraction settles out and the remainder of said liquid composition is separated using at least one centrifugal operation.

8. The process of claim 1 further characterized in that the water in the separated high molecular weight fraction is reduced sufficiently to form a concentrate containing at least about 10% by weight solids.

9. The process of claim 1 further characterized in that the fructose and glucose are reduced to less than 0.75% by weight in the separated liquid composition, and the liquid composition with reduced amounts of fructose and glucose is spray dried.

10. A process for preparing a granular product of inulin characterized by reduced hygroscopicity, comprising:

providing a liquid composition containing water and inulin;

reducing the monosaccharides in said inulin to less than about 0.75% by weight of the inulin; and spray drying the liquid composition having inulin with said reduced amounts of monosaccharides.

11. The process of claim 10 further characterized in that some of the water is removed from said liquid composition prior to spray drying.

12. The process of claim 11 in which some water is removed by a falling film evaporator prior to spray drying.

13. The process of claim 10 in which the monosaccharides are removed by filtering.

14. A process for separating differing molecular weight polysaccharides of inulin comprising:

providing a liquid composition containing water an inulin polysaccharides extracted from plant materials containing inulin;

said inulin polysaccharides comprising high molecular weight inulin polysacharidees at temperatures below about 7° C. for a length of time until at least some of the high molecular weight inulin polysaccharides settle out;

separating the at least some of the remainder of said liquid composition from at least some of said settled out high molecular weight inulin polysaccharides;

drying the remainder of said liquid composition to a granular product.

15. The process of claim 14 in which said temperatures are below about 3° C.

16. A process for separating differing molecular weight polysaccharides of inulin comprising:

providing a liquid composition containing water and inulin polysaccharides extracted from plant materials containing inulin;

said inulin polysaccharides comprising high molecular weight inulin polysaccharides and low molecular weight inulin polysaccharides;

maintaining said liquid composition containing said inulin polysaccharides at temperatures below about 7° C. for a length of time until at least some of the high molecular weight inulin polysaccharides settle out;

separating the at least some of the remainder of said liquid composition from at least some of said settled out high molecular weight inulin polysaccharides;

concentrating the remainder of said liquid composition to a syrup.

17. The process of claim 16 in which said temperatures are below about 3° C.

18. The process of claim 16 in which at least a portion of said settled out high molecular fraction is concentrated into a syrup.

19. The process or removing unwanted flavors from high molecular weight inulin fractions comprising:

providing a composition of high molecular weight inulin containing at least about 75% by weight of polysaccharides with molecular weights above about 2288;

washing said composition at least once with chilled de-ionized or distilled water at temperatures between about 0° C. to about 3° C.; and continuing said washing until said chilled de-ionized or distilled water carries the unwanted flavors away.

20. The process of removing unwanted flavors from low molecular weight inulin fractions comprising:

providing a liquid low molecular weight composition containing at least 75% by weight of inulin polysaccharides having molecular weight below about 2288;

heating such liquid low molecular weight inulin composition to temperatures above ambient;

pumping said heated liquid with low molecular weight inulin fractions through a series of carbon columns until the unwanted flavors disappear.

21. The process of claim 20 in which said heated liquid low molecular weight inulin composition is further treated by passing through a series of mixed bed ion-exchange columns to remove at least some potassium and iron.

* * * * *